No. 869,832.
PATENTED OCT. 29, 1907.
H. A. DEWING.
INDICATOR FOR TYPE WRITING MACHINES.
APPLICATION FILED JAN. 31, 1907.
2 SHEETS—SHEET 1.
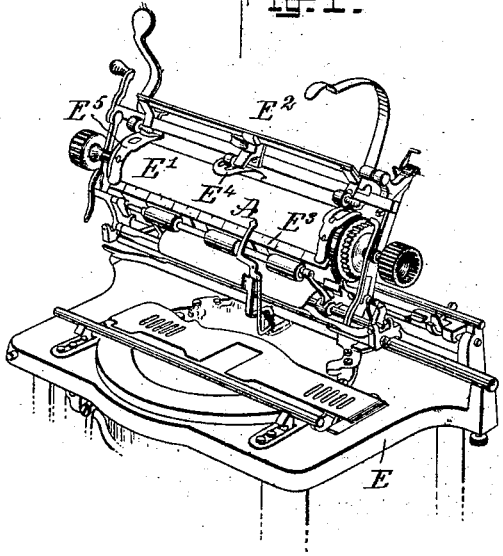
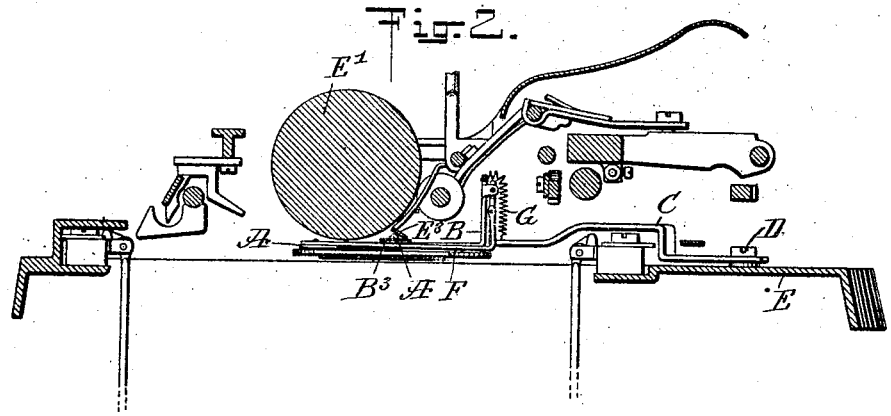
WITNESSES
INVENTOR
Henry A. Dewing
BY
ATTORNEYS No. 869,832. PATENTED OCT. 29, 1907.
H. A. DEWING.
INDICATOR FOR TYPE WRITING MACHINES.
APPLICATION FILED JAN. 31, 1907.
2 SHEETS—SHEET 2.
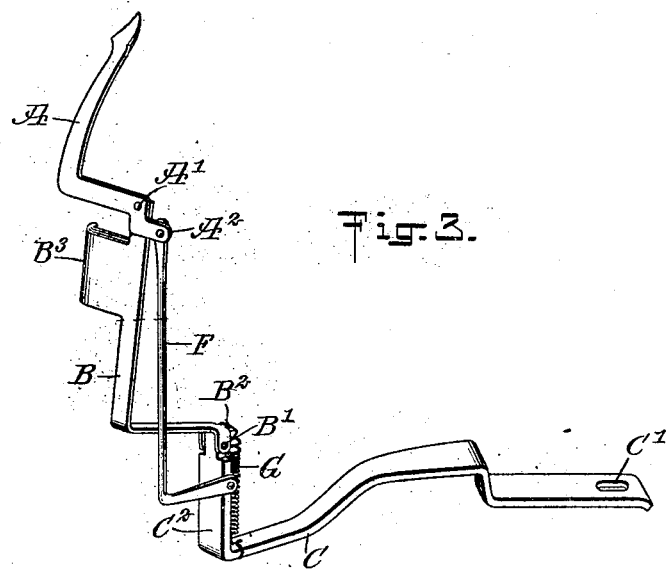
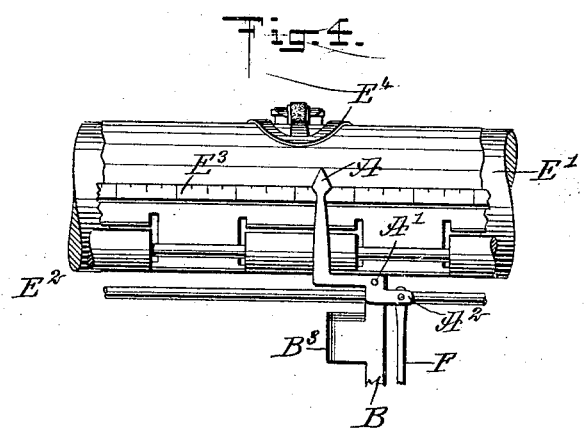
WITNESSES
INVENTOR
Henry A. Dewing
BY
ATTORNEYS

UNITED STATES PATENT OFFICE.

HENRY A. DEWING, OF SAN BUENAVENTURA, CALIFORNIA.

INDICATOR FOR TYPE-WRITING MACHINES.

No. 869,832.          Specification of Letters Patent.          Patented Oct. 29, 1907.

Application filed January 31, 1907. Serial No. 354,997.

*To all whom it may concern:*

Be it known that I, HENRY A. DEWING, a citizen of the United States, and a resident of San Buenaventura, in the county of Ventura and State of California, have invented a new and Improved Indicator for Type-Writing Machines, of which the following is a full, clear, and exact description.

The object of the invention is to provide a new and improved indicator for typewriting machines, arranged to indicate the exact point at which the character to be struck will appear on the paper, at the same time indicating the exact line above the scale at which the type will strike, thus permitting the operator to quickly manipulate the typewriting machine in filling in blanks, writing on ruled paper, and correcting errors or omissions, and when the carriage is raised the operator can see at a glance at what point the next character will appear.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement as applied to the Remington typewriting machine, the carriage of the latter being shown in a raised position; Fig. 2 is a transverse section of the same, showing the carriage in a lowermost active position; Fig. 3 is a perspective view of the improvement, and, Fig. 4 is a front elevation of the improvement as applied.

The pointer A of the indicator is fulcrumed at A' on a lever B pivoted at B' on a bracket C fastened by a screw D screwing into the frame E of the typewriting machine at the back thereof, as plainly indicated in Fig. 2, the said screw D passing through an elongated slot C' in the bracket C, to permit of adjusting the bracket to bring the pointer A in proper relation to the impression point on the platen E' held on the carriage E² of the typewriting machine. The screw D is preferably one of the two screws for fastening the escapement support of the typewriting machine in position.

The pointer A is provided at its heel or fulcrum end with an offset A² pivotally connected by an L-shaped link F with the upright member C² of the bracket C, and the heel of the lever B is provided with an offset B² engaged by one end of a coiled spring G attached at its other end to the bracket C. Now by the arrangement described, the spring G tends to hold the lever B and the pointer A in an uppermost position, as illustrated in Figs. 1 and 3, and allows it to swing the lever B and the pointer A downward to the inactive position illustrated in Fig. 2. For the purpose mentioned, the lever B is provided at one side with an offset B³ adapted to be engaged by the platen scale E³ held on the carriage E² when the latter is swung downward. Now, when the lever B is swung downward on swinging the carriage E² into a lowermost active position, then the link F imparts a swinging motion to the pointer A, so as to move the same into a longitudinal position, as indicated in Fig. 2, whereby the pointer is moved completely out of the path of any of the parts on the carriage. When the carriage E² is swung upward, then the spring G imparts an upward swinging motion to the lever B, and the link F imparts a swinging motion from left to right to the pointer A, so as to bring the terminal thereof at the impression point, thus indicating the exact point at which the character to be struck will appear on the paper held on the platen E' at the time. It is evident that when the carriage E² is swung downward the pointer A completely moves out of the way of the central paper guide E⁴ and the left hand paper guide E⁵, and the pointer is also out of the way of the type, to permit of manipulating the typewriting machine in the usual manner without danger of interference by the indicator.

It is expressly understood that the indicator only moves into an active position when the carriage E² is swung into an open position.

From the foregoing it will be seen that the pointer indicates the exact point at which the character to be struck will appear on the paper whenever the carriage is raised, and the pointer also indicates the exact line above the scale at which the character will strike. Say, for instance, it is desired to write on ruled paper: Now, it will be necessary to adjust the line on which to write to the edge of the platen scale and then turn the platen two spaces. A typewriting machine provided with the indicator requires turning of the platen until the line on which it is desired to write appears at the place indicated by the pointer, as will be readily understood by reference to Fig. 4. If a letter in a word has not been struck then the carriage can be readily shifted to move the pointer A opposite the vacant space on which the letter should appear. Thus, if in the word "soon" one of the first "o" had not been struck it is only necessary to bring the space between the "s" and "o" to the place indicated by the pointer A, after which the carriage is lowered and the letter "o" is struck.

The pointer A moves completely out of the way of the central paper guide E⁴, but when the carriage is in a certain position a downward motion of the carriage will sometimes cause the pointer A to catch under the left-hand paper guide E⁵, especially if the guide is sprung up, which will necessitate the removal of the lower portion of the paper guide, although it may be possible in such cases to bend either the pointer or guide to overcome such interference.

The offset B³ projects from the left-hand edge of the lever B a sufficient distance to keep the pointer mechanism from flying off the platen scale E³ when the carriage is brought to a stop at its furthermost position at the end of a line. The offset B³ is of sufficient width to cause it to remain on the platen scale E³ when the carriage is shifted back and forth for lower and upper case letters. The edge of the offset B³ is bent up to a sufficient height to throw the pointer mechanism entirely free of the platen and carriage, thus leaving the only point of contact, when the carriage is down, between the upturned edge of the offset B³ and the platen scale E³.

From the foregoing it will be seen that the indicator is very useful when using the typewriting machine for filling in blanks, writing on ruled paper, and correcting errors or omissions, and when the carriage is raised, the operator at a glance knows exactly where the next character will strike.

Having thus described my invention, I claim as new and desire to secure by Letters Patent:

1. The combination with the typewriter, of an indicator comprising a lever mounted to swing towards and from the platen, a spring acting normally to move the lever towards the platen, a pointer fulcrumed on the lever for swinging movement at right angles to the swinging movement of the lever, and means whereby the swinging of the lever against the resistance of the spring will swing said pointer on its fulcrum.

2. An indicator for typewriting machines, comprising a fixed bracket, a lever hinged thereto, a spring connecting the lever and the bracket, a pointer fulcrumed on the lever, one end of said pointer being provided with an indicator and a link connecting the other end and the bracket.

In testimony whereof I have signed my name to this specification in the presence of two subscribing witnesses.

HENRY A. DEWING.

Witnesses:
CLAY G. KNOX,
DON G. BOWKER.